United States Patent
Bringewatt et al.

(10) Patent No.: US 10,351,991 B2
(45) Date of Patent: Jul. 16, 2019

(54) METHOD AND DEVICE FOR THE TRANSPORT AND/OR SPREADING OUT OF LAUNDRY ITEMS HANGING FROM CLAMPS

(71) Applicant: Herbert Kannegiesser GmbH, Vlotho (DE)

(72) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 15/862,804

(22) Filed: Jan. 5, 2018

(65) Prior Publication Data
US 2018/0195231 A1 Jul. 12, 2018

(30) Foreign Application Priority Data

Jan. 12, 2017 (DE) .................. 10 2017 000 171

(51) Int. Cl.
*B65G 17/20* (2006.01)
*D06F 67/04* (2006.01)
(Continued)

(52) U.S. Cl.
CPC ............. *D06F 67/04* (2013.01); *B65G 17/20* (2013.01); *B65H 5/14* (2013.01); *D06F 95/008* (2013.01); *D06F 71/40* (2013.01)

(58) Field of Classification Search
None
See application file for complete search history.

(56) References Cited

U.S. PATENT DOCUMENTS

| 7,836,617 | B2* | 11/2010 | McCabe | ............. D06F 67/04 38/143 |
| 2004/0050655 | A1 | 3/2004 | Baboz | |
| 2008/0295367 | A1 | 12/2008 | McCabe | |

FOREIGN PATENT DOCUMENTS

| CH | 692085 A5 | 1/2001 |
| DE | 29715734 U1 | 11/1997 |

(Continued)

OTHER PUBLICATIONS

Deutsches Patent—Und Markenamt (German Patent and Trademark Office), Recherchenbericht (searchin a related application), Sep. 25, 2017.
(Continued)

*Primary Examiner* — Kavel Singh
(74) *Attorney, Agent, or Firm* — Laurence P. Colton; Smith Tempel Blaha LLC

(57) ABSTRACT

A method and device for directly determining the region of the respective laundry item to be inserted into a clamp. In this way, it is possible to determine whether the clamp has actually been loaded with a laundry item and whether the region of the laundry item designated for this has also been properly inserted into the clamp. During the transport and the spreading out of laundry items being washed it is customary at commercial laundry establishments to hang the laundry items from clamps, which are transported further by a conveyor to various processing stations. It happens that the clamps may move away before having been loaded with the laundry item. This results in operational disruptions in most cases.

14 Claims, 6 Drawing Sheets

(51) Int. Cl.
*D06F 95/00* (2006.01)
*B65H 5/14* (2006.01)
*D06F 71/40* (2006.01)

(56) References Cited

FOREIGN PATENT DOCUMENTS

| | | | |
|---|---|---|---|
| DE | 69309545 | T2 | 11/1997 |
| EP | 0573810 | A1 | 12/1993 |
| JP | 2011036312 | A | 2/2011 |
| WO | 2005038121 | A2 | 4/2005 |

OTHER PUBLICATIONS

European Patent Office, Europaischer Recherchenbericht (search in a related application), May 3, 2018.

* cited by examiner

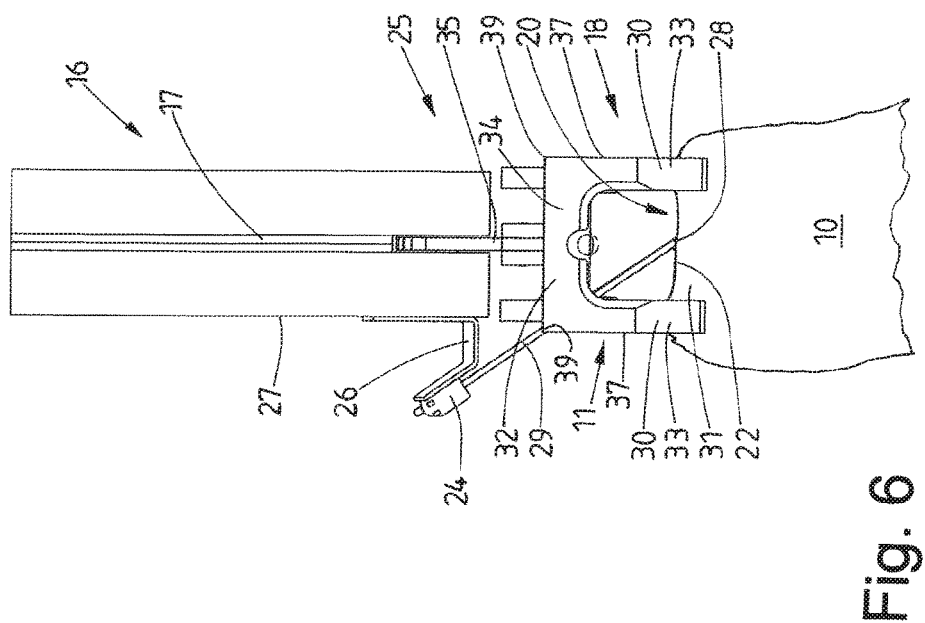
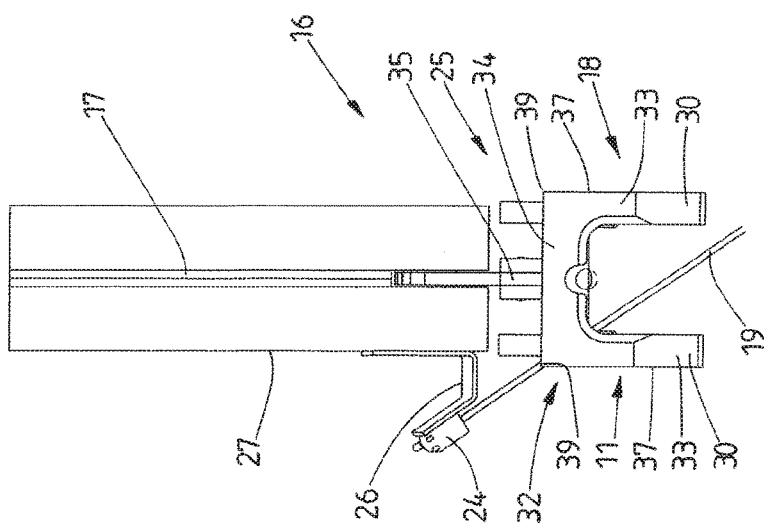
Fig. 6
Fig. 5

METHOD AND DEVICE FOR THE TRANSPORT AND/OR SPREADING OUT OF LAUNDRY ITEMS HANGING FROM CLAMPS

STATEMENT OF RELATED APPLICATIONS

This patent application claims priority on and the benefit of German Patent Application No. 10 2017 000 171.5 having a filing date of 12 Jan. 2017.

BACKGROUND OF THE INVENTION

Technical Field

The invention relates to a method for the transport and/or spreading out of laundry items hanging from clamps, wherein a region of a respective laundry item is inserted into a clamp and the laundry item is ascertained. The invention furthermore relates to a device for the transport and/or spreading out of laundry items hanging from clamps, with at least one clamp serving for the holding of a region of a laundry item on a conveyor for the movement of the at least one clamp and with at least one detection device ascertaining the presence of the laundry item.

Prior Art

Laundry items are transported and/or spread out in a condition hanging from clamps primarily at commercial laundry establishments. The clamps are part of a conveyor or a laundry processing machine. The clamps with the laundry items hanging from them are transported and/or spread out along a corresponding conveying path by driving means of the conveyor.

One region, often a corner region, of the respective laundry item is introduced or fed into the respective clamp having one or more clamping jaws prior to the start of the transport. This may be done manually or by machine.

In known methods and devices it happens that the particular region of the laundry item is not correctly or completely hung from the clamp. This creates the risk that the laundry item will become unintentionally loosened from the clamp during the transport or the spreading out, which may lead to problems in the work sequence. For this reason, it is also already known how to provide means of detection, which are supposed to monitor the loading process of the particular clamp. Thus far, for various reasons, such means of detection have been positioned so that they only detect a neighbouring region of the respective clamp being loaded each time with one laundry item. Thus, the correct hanging of the laundry item in the respective clamp cannot be detected. Furthermore, the means of detection ascertains the laundry item already before it is hung in the clamp, so that it may happen that the particular clamp already moves away before the laundry item has actually been hung in the clamp.

BRIEF SUMMARY OF THE INVENTION

The problem which the invention proposes to solve is to create a method and a device which ensure that a respective laundry item is properly, in particular completely, inserted into the provided clamp of the conveyor before the clamp is set in motion.

One method for the solving of this problem comprises a method for the transport and/or spreading out of laundry items hanging from clamps, wherein a region of a respective laundry item is inserted into a clamp and the laundry item is ascertained, characterized in that it is directly determined whether the region of the laundry item to be inserted into the respective clamp is present in that clamp. Accordingly, the region of the laundry item to be inserted into the respective clamp is directly detected. In this way, the presence of the laundry item, that is, that region of the laundry item which is supposed to be grasped by the clamp, is monitored directly in the clamp. Preferably, this determination only occurs when the respective region of the laundry item is sufficiently present in the clamp and/or has been inserted into the clamp in the required and/or necessary manner. As a rule, this is the case when the region of the laundry item to be inserted into the clamp is found entirely in the clamp. By the direct monitoring of the region of the laundry item to be inserted into the respective clamp it is ensured that the laundry item has been inserted into the clamp and in particular is also correctly present in the clamp, before the further transport of the particular clamp begins.

Preferably, it is provided to ascertain directly, by detection of at least one location of the region of the laundry item to be inserted or having been inserted into the clamp, whether the particular region of the laundry item is present in the clamp, in particular, whether it is correctly present in the clamp. Thus, it can be detected whether the clamp is ready and in position to further transport and/or spread out the laundry item. In particular, this reliably prevents the clamp from moving away before the laundry item has been hung from the clamp, especially before it has been inserted deep enough into the clamp.

It is especially advantageous to ascertain, by the direct determination of the region of the laundry item to be inserted or having been inserted into the clamp, whether this region of the laundry item is preferably present entirely in at least one clamping jaw of the clamp. In this way, it can be directly ascertained whether the laundry item is being held securely enough in the clamp for the subsequent transport.

One possible design of the method calls for ascertaining whether at least one significant location of the region of the laundry item to be inserted into the clamp is found in the clamp, especially in its clamping jaw. This significant location may be a margin, a seam, or an edge of the laundry item. Such a significant location may be ascertained such that it represents a proper and adequate loading of the clamp.

In the case of clamps with several clamping jaws placed alongside each other and serving for the joint holding of the region of the laundry item to be inserted into the clamp, it is provided to directly determine the region located between neighbouring clamping jaws, especially a corner region, of the laundry item. Between the clamping jaws the respective region, preferably a significant location thereof, can be directly determined or measured especially easily and distinctly and the location can be used as an indicator of a correct loading of the clamp, which in the case of several clamping jaws may also be called a multiple clamp or double clamp.

In one preferred embodiment of the method it is provided that the region of the laundry item held in the respective clamp is determined directly by a noncontact, optical and/or acoustical detection, especially a sensing, in at least one location of the region of the laundry item held in the clamp. Such a detection can be implemented especially easily in the method. It does not hinder the method and is not prone to malfunction.

Preferably, the noncontact sensing of the at least one location of the region of the laundry item held in the clamp is done by reflection of light and/or sound waves or sound pulses. Such a sensing can be realized without mechanical means and can therefore be done especially advantageously directly.

According to one advantageous modification of the method, the noncontact sensing of the at least one location of the region of the laundry item held in the clamp occurs through at least one window and/or one opening of the clamp.

The window and/or the opening is/are situated preferably in a housing or a base of the clamp, and especially where the clamp and the housing or the base have no moving parts. Through the at least one opening or the window, a signal path can pass unhindered, by which the noncontact sensing of the at least one location of the laundry item occurs. The location of the region of the laundry item situated in the clamp to be detected can thereby be reached directly by the signal path or is immediately accessible from the signal path, without being disturbed by any parts of the clamp, especially of the housing or the base of the clamp. Thus, the signal path or a measuring rod thereof can also detect such a location which would not otherwise be accessible. In particular, an interior location of the region of the laundry item held in the clamp and preferably lying exposed is directly accessible to the signal path, making it possible to determine directly, particularly in a noncontact manner, a significant location of the region of the laundry item held in the clamp.

A device for solving the aforementioned problem is a device for the transport and/or spreading out of laundry items hanging from clamps, with at least one clamp serving for the holding of a region of a laundry item on a conveyor for the movement of the at least one clamp and with at least one detection device ascertaining the presence of the laundry item, characterized in that the detection device is designed to directly ascertain the presence of the region of the laundry item in the clamp. Accordingly, a detection device is provided which directly ascertains the presence of the designated region of the laundry item in the clamp. Therefore, unlike what was previously done, the region of the laundry item being inserted into the clamp is determined not prior to the inserting, but afterwards, and preferably only when the region is also situated in the clamp and/or the inserting is finished. In this way, wrong information and the resulting operation disruptions are reliably prevented.

Preferably the at least one detection device is designed to generate at least one optical or acoustical signal path and/or such a signal beam.

It may be provided that the signal path is aimed directly at a location of the region of the laundry item situated in the clamp. Thanks to such a design of the detection device, the region of the laundry item having been inserted into the clamp can be determined or detected especially advantageously directly.

According to one preferred embodiment of the device, the at least one detection device is arranged stationary at the conveyor. Preferably, the at least one detection device is situated on a stationary and/or immovable part of the conveyor. In this way, the detection device does not need to move along with the clamp and it is enough to provide in particular at least one detection device at the loading point or transfer point of the laundry item from one clamp to another. The detection occurs each time upon passage of a respective clamp past the at least one detection device. A detection device will interact with all clamps or selected clamps of the conveyor. In this way, it is not necessary to assign each clamp its own detection device. Furthermore, the data transfer from a stationary detection device is easier and less prone to malfunction.

Preferably in the case of clamps with a single clamping jaw it is provided to ascertain the presence of the region of the laundry item in the clamping jaw by the detection device through a direct detection of a location of the laundry item situated in the clamping jaw. It will then determine directly the condition in which the region of the laundry item inserted into the clamp is also actually situated in the clamp. Such a detection is very reliable.

In clamps with at least two clamping jaws placed alongside each other with a spacing, especially so-called multiple or double clamps, it is preferably provided that the at least one detection device views or detects a free space or interior space between two neighbouring clamping jaws of the clamp. In this way, the region of the laundry item situated between neighbouring clamping jaws in the particular double or multiple clamp is determined directly. This location of the region of the laundry item inserted into the clamp and situated between neighbouring clamping jaws lies open and is therefore especially accessible to measurement signals of the detection device. Thus, one may avoid disturbances due to any parts of the clamp, especially the clamping jaws.

One advantageous modification of the device calls for providing at least one opening or a window in the respective clamp for the passage of the at least one signal path of the means of detection or detection device. In this way, the signals of the detection device may arrive unhindered at the location of the region of the laundry item inserted into the respective clamp which is being detected directly.

The respective opening and/or the window is/are arranged in the clamp or in each clamp such that the location of the laundry item being detected is directly accessible to and can be detected by the means of detection. Preferably, it is provided to arrange the at least one opening and/or the window in the respective clamp such that the signal path and/or the signals of the means of detection can impinge on the designated location of the laundry item, especially between two neighbouring clamping jaws of the respective clamp. This ensures an unhindered and direct detecting of a significant location of the region of the laundry item inserted into the clamp, especially if the inserting of the laundry item into the clamps is completed. Thus, one may also check to see whether the region of the laundry item being inserted into the clamp is situated in the correct position in the clamp and/or has been inserted far enough into the clamp.

BRIEF DESCRIPTION OF THE DRAWINGS

A preferred exemplary embodiment of the invention shall now be explained more closely with the aid of the drawing. This shows:

FIG. 5 is a front view of the representation of FIG. 3;

FIG. 6 is the representation of FIG. 5 with a laundry item inserted into the clamp.

DETAILED DESCRIPTION OF PREFERRED EMBODIMENTS

The device shown in the figures is preferably employed in commercial laundry establishments. The device serves for the transporting of laundry items 10 hanging from a clamp 11.

Figure 1:
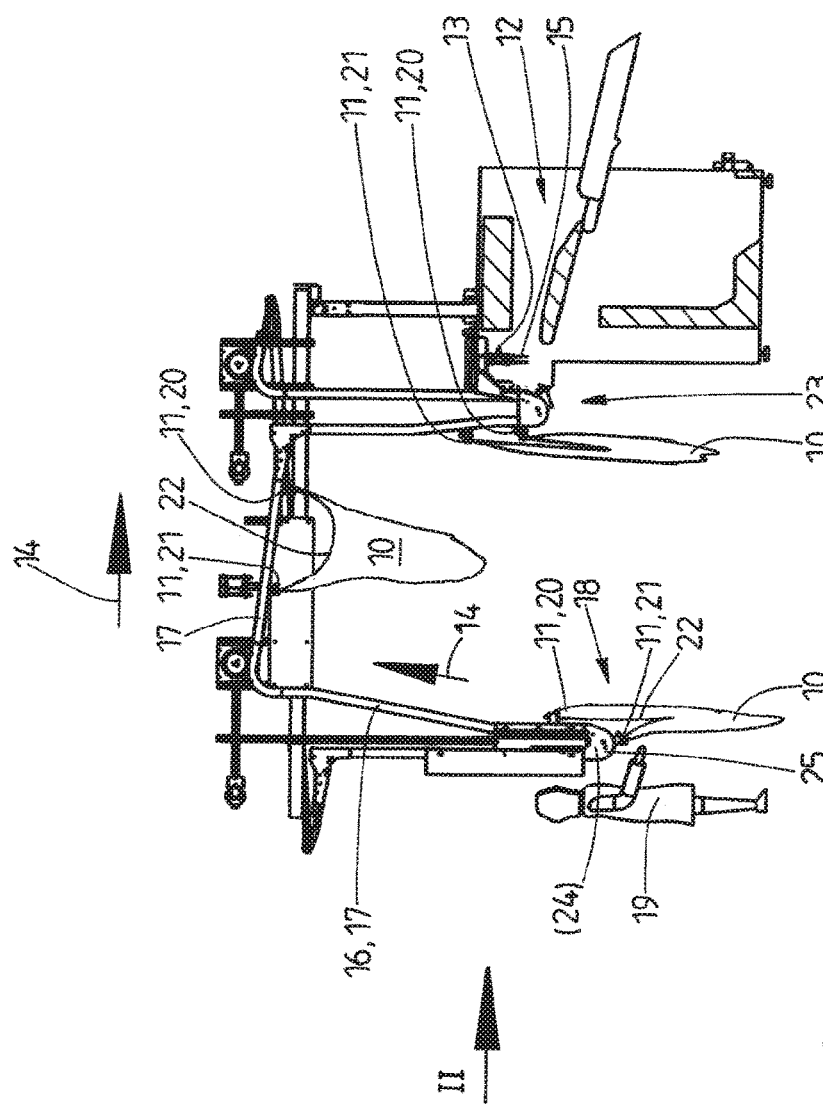
FIG. 1 is a schematic side view of the device in front of a feeding machine.

FIG. 1 shows the device in front of a so-called feeding machine 12 for the spreading out of the respective laundry item 10 and taking it in the spread-out condition to a following laundry processing machine, such as a trough mangle, not shown. For the spreading out of the respective laundry item 10, the feeding machine 12 has a spreading device 13 with spreading clamps 15 which can travel transversely to the transport direction 14.

The device arranged in front of the feeding machine 12 in the exemplary embodiment of FIG. 1 comprises a conveyor 16. The conveyor 16 has a rail 17 dictating the transport path, on which or in which a plurality of consecutively spaced apart and preferably identical clamps 11 can travel, for example by trolleys carrying the respective clamps 11. At least in parts, the rail 17 is coordinated with a circulating driven transport lane, by which the clamps 11 can travel in the transport direction 14 along the rail 17 or at least certain sections of the rail 17.

At a loading station 18 of the conveyor 16, an attendant 19 each time inserts a single laundry item 10 into the clamps 11. In the exemplary embodiment shown, this laundry item 10 is suspended in two consecutive clamps 11 by two neighbouring regions, preferably opposite corner regions 20, 21, of a margin 22 of the laundry item 10 to be stretched by the spreading device 13.

The laundry items 10 hanging from the clamps 11 are then transported along the rail 17 of the conveyor 16 to the feeding machine 12. In this process, the conveyor 16 can serve as a storage or buffer for a number of laundry items 10, thanks to a rail 17 of appropriate length, waiting to be handed off by the clamps 11 to the spreading clamps 15 of the feeding machine 12. The hand-off of the corner regions 12 of the laundry items 10 from the clamps 11 of the device to the spreading clamps 15 of the feeding machine 12 occurs preferably automatically and in succession. For this, the device has a corresponding unloading station 23 in front of the spreading device 13 of the feeding machine 12.

Figure 2:
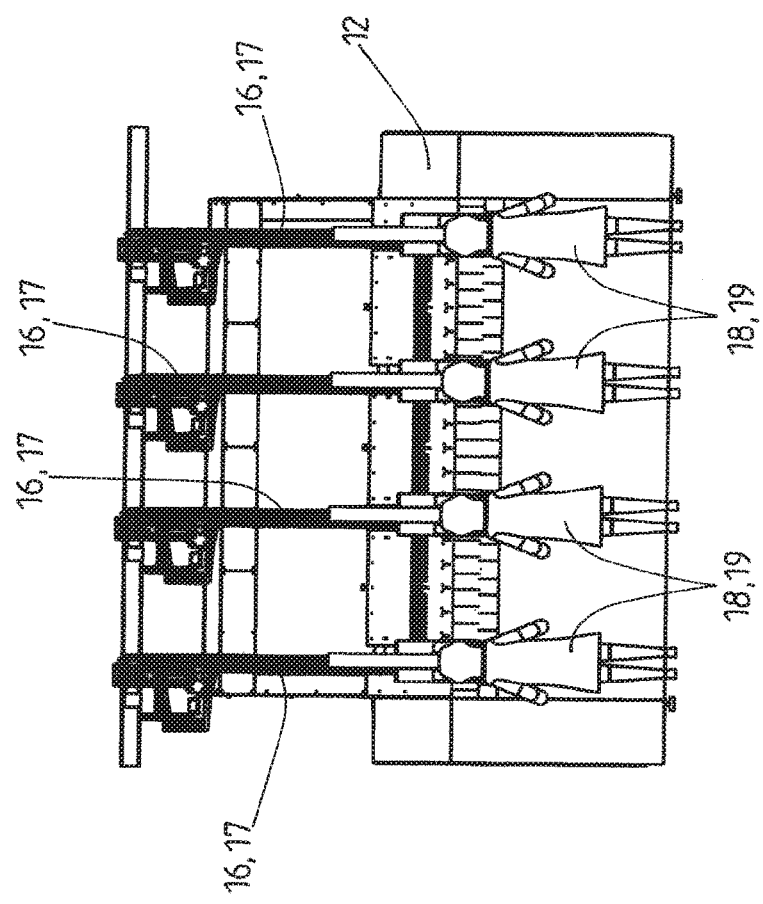
FIG. 2 is a view II of the device of FIG. 1.
Figure 3:
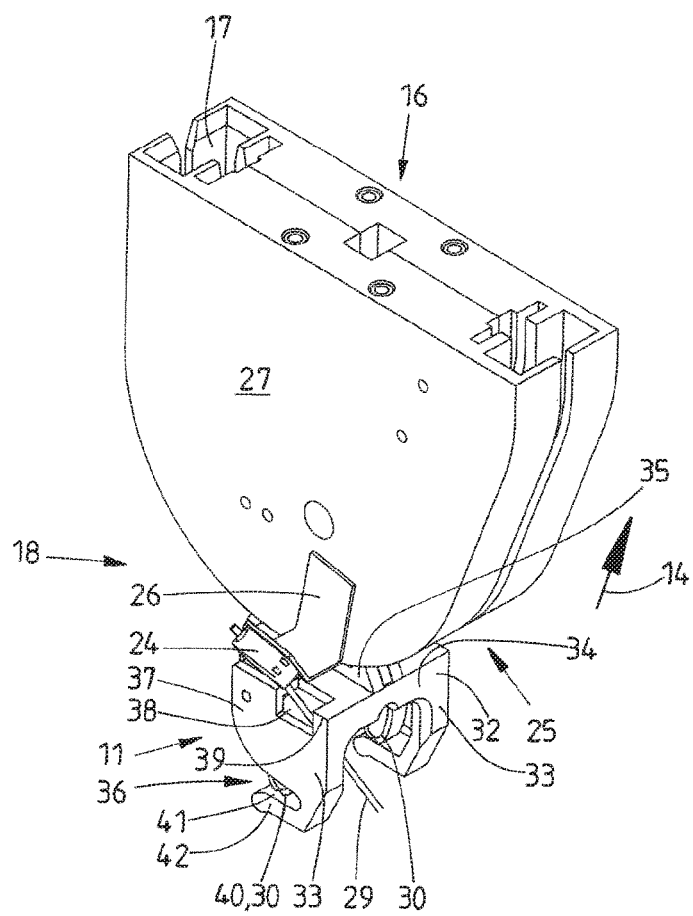
FIG. 3 is a perspective representation of part of the device with a clamp being transported onward by the conveyor and a detection device.

It emerges from FIG. 2 that four preferably identical devices are arranged in parallel alongside each other in the exemplary embodiment depicted and can be operated at the same time independently of each other. Accordingly, four loading stations 18 are provided placed alongside each other, each with an attendant 19. The four devices take the laundry items 10 to a single common feeding machine 12. This may occur in a multiple-lane, but also a single-lane or alternately single-lane and multiple-lane operation of the feeding machine 12. But the invention is not limited to four devices arranged alongside each other. It is conceivable for a larger or smaller number of devices to be arranged in front of the feeding machine 12 and also possibly only a single device.

FIGS. 3 to 7 show one of the identical clamps 11 of the device in the region of a detection device 24. While the clamps 11 can move or travel in the transport direction 14 along the rail 17 of the conveyor 16, the detection device 24 is arranged stationary at the respective loading station 18. The detection device 24 is located at the side, next to a lower U-shaped turning point 25 of the rail 17 of the conveyor 16. The detection device 24 is secured by a holding bracket 26 to a semicircular side panel 27 of the turning point 25 situated in the lower region.

Figure 4:
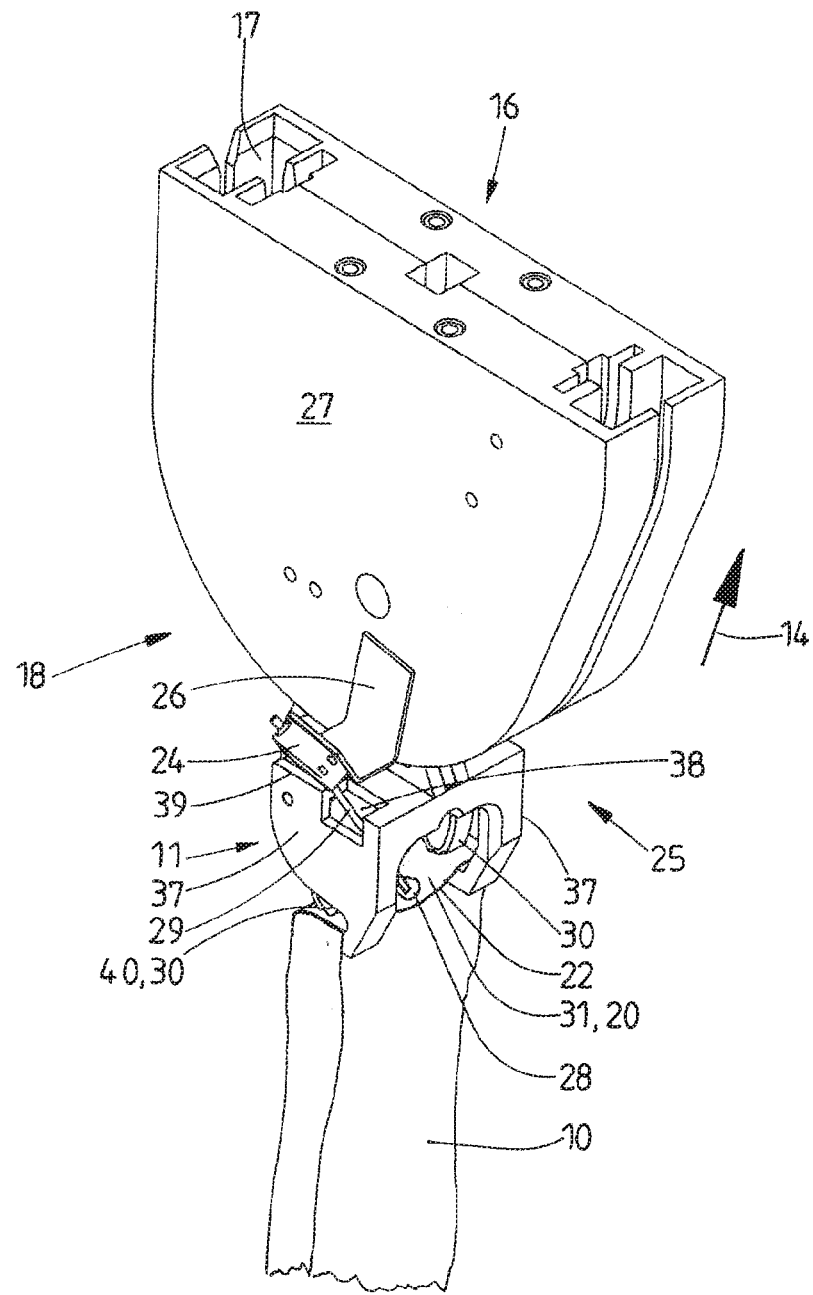
FIG. 4 is the view of FIG. 3 with a laundry item inserted into the clamp.
Figure 7:
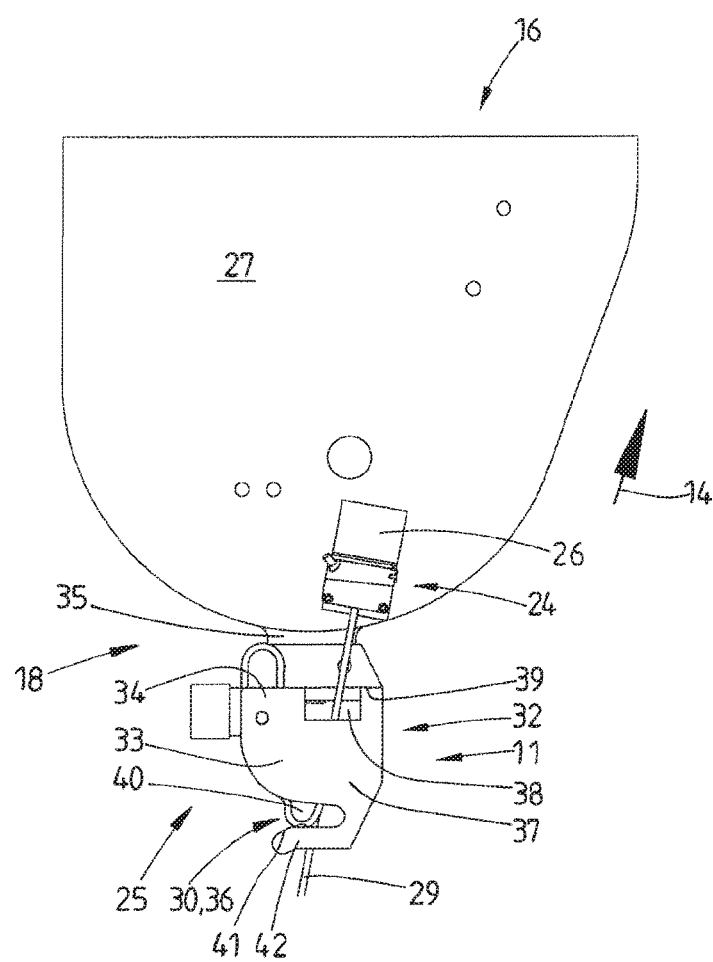
FIG. 7 is a side view of the device according to the representation of FIG. 3.

The detection device 24 is a device which directly determines in noncontact manner a location 28 of a corner region 20 or 21 of a particular laundry item 10 hanging in the clamp 11, as represented symbolically by a circle in FIG. 4. This is done preferably by a noncontact sensing of the location 28 of the respective corner region 20, 21 of the laundry item 10 by optical and/or acoustical signals and/or waves, such as sound waves, electromagnetic waves or light waves. These generate a signal path 29, idealized as a beam, which may be invisible, and which is represented in the exemplary embodiment shown. The beam may be an uninterrupted light beam, especially a laser beam. It is also conceivable for the signal path 29 to be formed by a regular or irregular succession of individual signals or pulses in time.

The particular clamp 11 being loaded is briefly stopped in the defined position at the loading station 18 so that the attendant 19 may insert a corner region 20 or 21 of a laundry item 10 into the clamp 11. Attuned to this position, the detection device 24 is secured immovably to the side panel 27 of the loading station 18. Therefore, the detection device 24 can always sense directly in noncontact manner the designated location 28 of the corner region 20 or 21 of the laundry item 10 inserted into the clamp 11 when a clamp 11 is situated in the position of rest required for the loading at the loading station 18.

The clamp 11 of the exemplary embodiment of the device shown here is designed as a double clamp with two identical clamping jaws 30 arranged in parallel alongside each other. The respective corner region 20, 21 of a laundry item 10 is shoved at the same time into the two clamping jaws 30 during the loading. This produces a short stretched section of the margin 22, especially the front margin, of the laundry item 10 which is held in a free space between the slightly spaced apart clamping jaws 30 and an adjoining narrow marginal strip of the corner region 20 or 21.

The location 28 which is determined directly by the detection device 24 is situated on the narrow marginal strip 31 of the corner region 20 or 21 of the laundry item 10 which is held between the clamping jaws 30 of the clamp 11. In the exemplary embodiment shown, the location 28 is somewhat spaced away from the margin 22. Optionally, the detection device 24 may also directly determine such a location of the corner region 20 or 21 of the laundry item 10 situated on the margin 22.

The clamp 11 shown, designed as a double clamp, has a base 32 fashioned in roughly U shape looking in the direction of insertion of the laundry item 10 into the clamping jaws 30, especially in the manner of a U-profile. For this, the base 32 has two parallel vertical legs 33 of identical configuration, somewhat spaced apart, each of them with a clamping jaw 30 and a horizontal web 34 joining the upper ends of the two legs 33. A top side of the web 34 has a connecting piece 35 for joining the base 32 of the clamp 11 to a trolley running in the rail 17 of the conveyor 16.

The base 32 of the clamp 11 is a single piece, preferably formed of plastic, so that the legs 33 and the web 34 are coherent.

The clamping jaws 30 are arranged in the two legs 33 so that their insert openings 36 are facing the respective attendant 19 at the loading station 18. The inserting direction of the respective laundry item 10 in the clamping jaws 30 preferably or approximately runs parallel to the transport direction 14 of the clamp 11.

The legs 33 of the base 32 of the clamp 11, especially outer vertical side surfaces 37 of the legs 33, run parallel to the side panel 37 of the conveyor 16 (FIGS. 5 and 6).

The base 32 of each clamp 11 has an opening 38 for the detection device 24, especially its signal path 29 (FIG. 4). The opening is disposed at such a location of the base 32 of the clamp 11 that the signal path 29 of the detection device 24 intersects the opening 38 when the clamp 11 is briefly halted in the loading position at the loading station 18.

In the exemplary embodiment shown, the opening 38 is situated at a corner between one leg 33 pointing toward the detection device 24 and the adjoining web 34 of the base 32 of the clamp 11. This produces a right-angled opening 38, whose upper half starting from the leg 33 extends in the web 34 and whose lower half starting from the web 34 is situated in the leg 33. Each of the two cohesive parts of the opening 38 has a right-angled base surface, such that the two parts together form a right-angled or square opening 38 projected into an imaginary plane.

The signal path 29 of the detection device 24 runs through the opening 38 or intersects it at an angle to the vertical between 25° and 45°, preferably around 30° and 40°. In this way, the signal path 29 impinges on the location 28 of the marginal region 31 of the laundry item 10 situated between the clamping jaws 30 roughly in the middle between the clamping jaws 30 (FIG. 6). The direction of the signal path 29 is chosen such that it runs down the middle of the opening 38 and thereby intersects a horizontal edge 39 between the leg 33 facing the detection device 24 and the web 34 of the base 32 of the clamp 10.

The clamping jaws 30 may be designed in known manner, each of them having a clamping tongue 40 which is spring-loaded in the closing sense, mounted so as to swivel about a preferably horizontal pivot axis in the respective leg 33. The clamping tongue 40 clamps the marginal strip 31 of the laundry item 10 against a horizontal or slightly slanting bearing surface 41 of a clamping nose 42 which is arranged or formed to be fixed to the respective leg 33. In this way, the marginal strip 31 of the laundry item 10 held fast in the clamping jaws 30 is oriented horizontally or slightly slanted, so that the signal path 29 of the detection device 24 impinges slanting at an angle of 25° to 45°, preferably 30° to 40°, on the location 28 of the marginal strip 31 being detected (FIGS. 4 and 6).

The method according to the invention shall be explained now with the aid of the above-described device:

The detection device 24 directly determines in noncontact manner the location 28 of the marginal strip 31 of the laundry item 10 held between the clamping jaws 30 of the clamp 11 and lying exposed. The location 28 is directly sensed in noncontact manner by the beam-like signal path 29 of the detection device 24. The detection of the location 28 occurs only when the marginal strip 31 has been inserted into the clamping jaws 30 of the clamp 11 and is held by the clamping jaws 30. Preferably the location 28 of the marginal strip 31 of the laundry item 10 is directly detected in noncontact manner only if the marginal strip 31 is fully inserted into the clamps 11.

The noncontact determination of the location 28 of the laundry item 10 occurs with a clamp 11 halted for the moment in the loading station 18. Preferably, the clamp 11 is situated in the region of the lower turning point 25 of the loading station 18 of the conveyor 16. The opening 38 in the clamp 11, especially in its base 32, and the detection device 24 are positioned such that, with the clamp 11 halted for the moment at the loading station 18 for the loading, i.e., stationary, the beam-like signal path 29 can pass unhindered through the opening 38 in the base 32 of the clamp 11. The signal path 29 may arrive in the intermediate space enclosed between the two parallel legs 33 of the base 32 of the clamp 11 and located in the interior of the base 32, and thus directly determine and/or detect the location 28 of the laundry item 10 as soon as the marginal strip 31 of the laundry item 10 has been shoved by the attendant 19 into the two clamping jaws 30 of the clamp 11. Preferably, this direct detection occurs when, and especially only when, the marginal strip 31 is correctly shoved far enough into the clamping jaws 30 of the clamp 11. The direct detection of the location 28 then signifies that the marginal strip 31 of the laundry item 10 is not only shoved into the clamping jaws 30 of the clamp 11, but also is far enough in the clamping jaws 30 of the clamp 11.

The direct detection of the location 28 of the marginal strip 31 of the laundry item 10 in the clamp 11 occurs by noncontact sensing of the location 28. In a preferably acoustically or optically working detection device 24, acoustic signals impinging on the location 28 on the signal path 29 or optical beams such as light beams, laser beams, or the like, are reflected at the location 28. The signals or the beam then return to the starting point of the signal path 29, preferably a receiver of the detection device 24. This processes the received signals and sends them on to a control unit, which only starts the further transport of the clamp 11 from the loading station 18 if the detection device 24 has determined that the location 28 being determined directly is situated between the clamping jaws 30 of the clamp 11 where the marginal strip 31 should be when the laundry item 10 has been inserted, especially fully inserted, into the clamp 11.

The location 28 of the marginal strip 31 of the laundry item 10 to be determined directly by the signal path 29 of the detection device 24 may be situated directly on the margin 22, but also at a certain predetermined distance from the margin 22. Preferably, moreover, the location 28 is situated between the two clamping jaws 30 or the leg 33 of the base 32 of the clamp 11 having the clamping jaws 30. By appropriate aiming of the detection device 24, especially the signal path 29 generated by it, the end of the signal path 29 impinging on the location 28 arrives directly at the location 28 of the marginal strip 31 being detected between the clamping jaws 30 of the clamp 11 without being influenced by the clamp 11, especially its base 32, between the legs 33.

The above described method may also be used alternatively or additionally at the unloading station 23 of the conveyor 16, i.e., where the corner regions 20, 21 and/or the marginal strip 31 of the laundry item 10 are mechanically and/or automatically handed off by the clamps 11 of the conveyor 16 preferably in succession to the spreading clamps 15 of the spreading device 13 of the feeding machine 12.

LIST OF REFERENCE NUMBERS

10 Laundry item
11 Clamp
12 Feeding machine
13 Spreading device
14 Transport direction
15 Spreading clamp
16 Conveyor
17 Rail
18 Loading station
19 Attendant
20 Corner region
21 Corner region
22 Margin
23 Unloading station 24 Detection device
25 Turning point
26 Holding bracket
27 Side panel
28 Location
29 Signal path
30 Clamping jaw
31 Marginal strip
32 Base
33 Leg
34 Web
35 Connecting piece
36 Insert opening
37 Side surface
38 Opening
39 Edge
40 Clamping tongue
41 Bearing surface
42 Clamping nose

What is claimed is:

1. A method for the transport and/or spreading out of laundry items (10) hanging from clamps, comprising:
   inserting a region of a respective laundry item (10) into a clamp (11); and
   ascertaining that the laundry item (10) is present in the clamp (11) by a direct determination of whether the region of the laundry item (10) to be inserted into the clamp (11) is present in the clamp (11), wherein the direct determination of the region of the laundry item (10) inserted into the clamp (11) occurs through at least one window and/or one opening (38) located in a base (32) of the clamp (11).

2. The method according to claim 1, further comprising, by detection of at least one location (28) of the region of the laundry item (10) inserted into the clamp (11), ascertaining whether the region of the laundry item (10) inserted into the clamp (11) is correctly introduced in the clamp (11) and is held by clamping jaws (30) of the clamp (11).

3. The method according to claim 1, further comprising, by the direct determination of the region of the laundry item (10) inserted into the clamp (11), ascertaining whether the region of the laundry item (10) present in the clamp (11) is in a correct position in the clamp (11), the correct position being whether the region of the laundry item (10) inserted into the clamp (11) has been inserted far enough into the clamp (11).

4. The method according to claim 1, further comprising ascertaining whether at least one location (28) of the region of the laundry item (10) inserted into the clamp (11) is found in at least one clamping jaws (30) of the clamp (11).

5. The method according to claim 4, wherein the clamp (11) has several of the clamping jaws (30) placed alongside each other and serving for the joint holding of the region of the laundry item (10) inserted into the clamp (11), and further comprising a direct determination of the at least one location (28) of the region of the laundry item (10) to be held between two neighbouring of the several of the clamping jaws (30).

6. The method according to claim 1, wherein the direct determination of the region of the laundry item (10) held in the clamp (11) is sensed by a noncontact sensing of at least at one location (28) of the region of the laundry item (10) inserted into the clamp (11), the noncontact sensing being selected from the group consisting of optical sensing, acoustical sensing, and combinations thereof.

7. The method according to claim 6, wherein the noncontact sensing of the at least one location (28) of the region of the laundry item (10) inserted into the clamp (11) is done by reflection of at least one of light, sound, light waves, sound pulses, and sound signals.

8. A device for the transport and/or spreading out of laundry items (10) hanging from clamps (11), comprising:
   at least one clamp (11) serving for the holding of a region of a laundry item (10) on a conveyor (16) for the movement of the at least one clamp (11); and
   at least one detection device (24) ascertaining the presence of the laundry item (10) in the at least one the clamp (11),
   wherein the at least one detection device (24) is configured to directly ascertain the presence of the region of the laundry item (10) in the at least one clamp (11) and to generate at least one signal path (29) selected from the group consisting of optical signal paths and acoustical signal paths, and
   wherein the at least one clamp (11) has at least one window and/or one opening (38) for the passage of the at least one signal path (29) of the at least one detection device (24).

9. The device according to claim 8, wherein the at least one signal path (29) of the at least one detection device (24) is aimed directly at least at one location (28) of the region of the laundry item (10) held in the at least one clamp (11).

10. The device according to claim 8, wherein the at least one detection device (24) is arranged stationary on a stationary part of the conveyor (16).

11. The device according to claim 8, wherein the at least one clamp (11) comprises a clamping jaw (30) for the grasping and/or holding of the region of the laundry item (10), wherein the presence of the region of the laundry item (10) in the clamping jaw (30) is ascertained by the at least one detection device (24) through a direct detection of a location (28) of the region of the laundry item (10) held in the clamping jaw (30) or in proximity to the clamping jaw (30).

12. The device according to claim 11, wherein the at least one clamp (11) has at least two of the clamping jaws (30) placed alongside each other with a spacing, configured as a double clamp, wherein the at least one detection device (24) directly determines the location (28) of the region of the laundry item (10) situated between two neighbouring of the at least two of the clamping jaws (30), the location (28) of the region of the laundry item (10) being a free space of the region of the laundry item (10) held by the at least two clamping jaws (30).

13. The device according to claim 12, wherein the at least one window and/or one opening (38) is arranged in the at least one clamp (11) such that the location (28) of the region of the laundry item (10) being detected is detected by the at least one signal path (29) of the at least one detection device (24) impinging directly on the location (28) of the region of the laundry item (10) in the free space between the two neighbouring clamping jaws (30).

14. The device according to claim 13, the at least one window and/or one opening (38) is arranged in the at least one clamp (11) such that the location (28) of the region of the laundry item (10) also is measured by the at least one detection device (24).

* * * * *